United States Patent Office 2,977,971
Patented Apr. 4, 1961

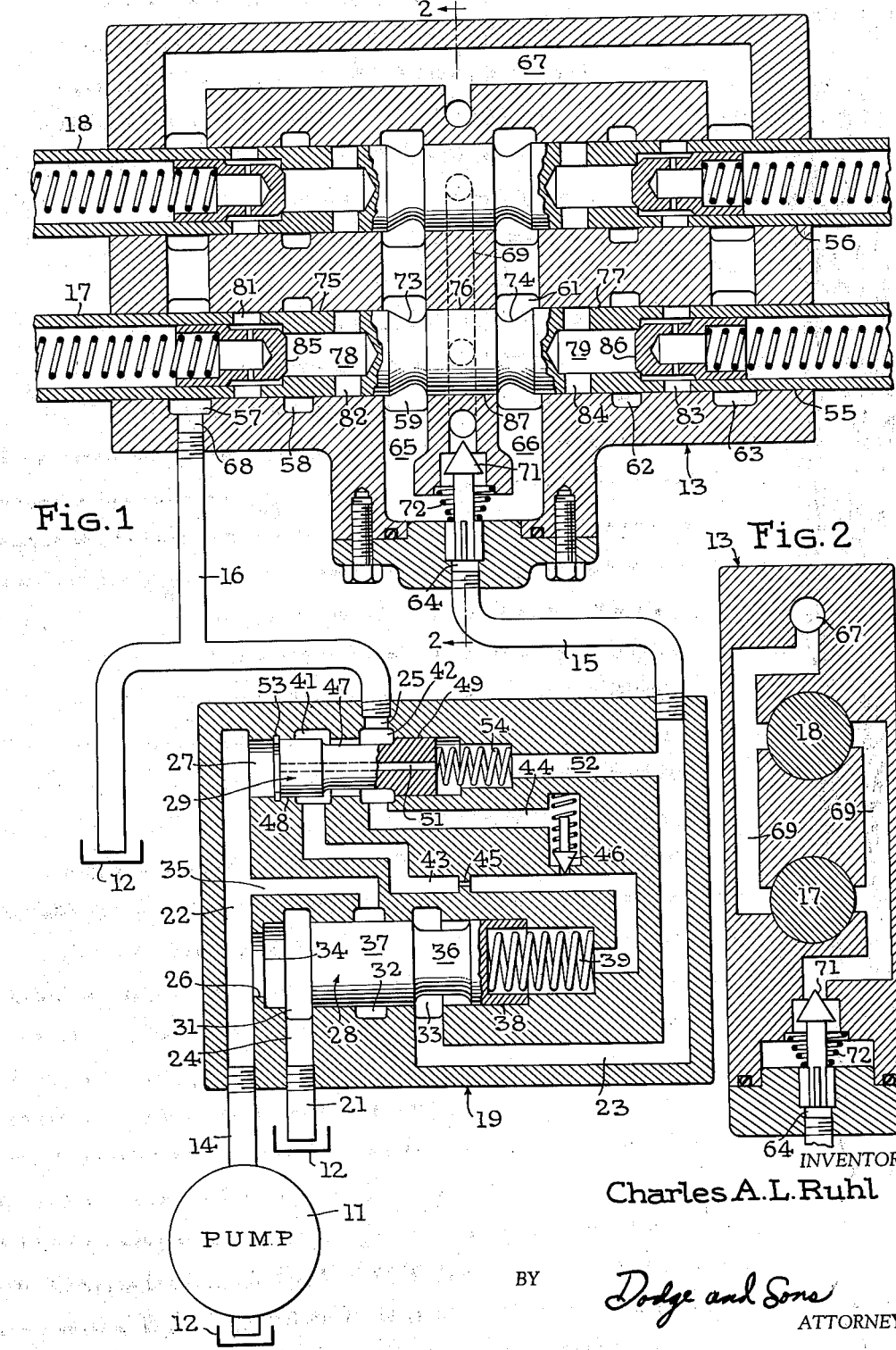

2,977,971

FLUID DISTRIBUTION SYSTEM AND VALVES THEREFOR

Charles A. L. Ruhl, Kalamazoo, Mich., assignor to The New York Air Brake Company, a corporation of New Jersey Filed Apr. 3, 1958, Ser. No. 726,141

8 Claims. (Cl. 137—108)

This invention relates to fluid distribution systems and more particularly to systems for supplying pressure fluid to closed-center distributing valves.

In these systems, pressure fluid is usually supplied by a constant displacement pump. When the distributing valve is in its neutral position, the delivery line from the pump to the distributing valve is closed. In order to minimize energy losses and prevent damage to the pump, it is necessary to provide a device for unloading the pump when the distributing valve is in this position. In order to provide optimum control, the unloading device should shift rapidly between its loading and unloading positions, so that the flow of unloaded fluid is not throttled or graduated.

The object of this invention is to provide a nongraduated flow-rate-responsive unloading device for interposition between a constant displacement pump and a closed-center distributing valve. In its preferred form, the unloading device includes an unloading valve shiftable between loading and unloading positions in which it connects the pump with the delivery line and with a sump, respectively. The unloading valve is biased toward its loading position by a spring and by a piloted pressure motor connected with a pilot valve. The unloading valve is urged in the opposite direction by a biasing motor subject to the pressure upstream of the unloading valve. The device also includes a control passage which connects the pump with the delivery line downstream of the unloading valve, thus providing a bypass around this valve. A pilot valve, shiftable in response to the flow rate through the control passage, connects the piloted pressure motor with the pump when the flow rate through this passage is above a predetermined minimum rate, and connects this motor with the sump when the flow rate is below that minimum rate. When the distributing valve is in its neutral position and flow through the control passage ceases, the piloted pressure motor is vented and the biasing motor shifts the unloading valve to its unloading position against the bias of the spring. When the distributing valve is shifted away from its neutral position to deliver fluid to a point of use, the pressures in the biasing motor and the piloted pressure motor are equalized and the spring shifts the unloading valve to its loading position. Since the pressure in the piloted pressure motor can have only two values, namely, completely pressurized or completely vented, the unloading valve will have no intermediate or unloading flow-graduating position.

Frequently the distributing valve must supply pressure fluid to a controlled motor which is under load. If the back pressure imposed on the delivery line by this load is greater than the unloaded pressure of the pump, there will be no flow through the control passage and consequently the pilot valve will not shift to its piloted-pressure motor pressurizing position. In order to remedy this situation, the invention provides an improved distributing valve which affords a momentary flow path between the delivery line and the sump, when it is shifted away from its neutral position. The back pressure imposed by this path is always less than the unloaded pressure of the pump and therefore, when the distributing valve is shifted, there will always be sufficient flow through the control passage to shift the pilot valve and thus pressurize the piloted pressure motor.

A further feature of the invention relates to means for converting the nongraduating unloading valve to a graduating relief valve when pressure surges are encountered in the system. In this way, the unloading valve serves to relieve these peak pressures.

A preferred embodiment of the invention will now be described in relation to the accompanying drawing, in which:

Fig. 1 is a schematic diagram of the fluid distribution system including cross-sectional views of the unloading device and distributing valve.

Fig. 2 is a cross-sectional view taken on line 2—2 of Fig. 1.

Referring to Fig. 1, the distribution system comprises a constant displacement pump 11 arranged to transmit pressure fluid from sump 12 to distributing valve 13 through supply line 14 and delivery line 15. Fluid is returned to the sump from valve 13 by return line 16. Each of the two plungers 17 and 18 of the distributing valve 13 controls the flow of fluid to and from a double-acting piston motor (not shown). Interposed between supply line 14 and delivery line 15 is a unloading device 19. When the distributing valve plungers 17 and 18 are in their neutral positions (as shown), the unloading device unloads the pump 11 to the sump 12 via return line 21. When one of the plungers 17 and 18 is shifted from its neutral position, the unloading device 19 loads the pump 11 by connecting supply line 14 with delivery line 15.

The unloading device 19 is formed with a supply passage 22, a delivery passage 23, and two exhaust passages 24 and 25. Two cylindrical valve bores 26 and 27 intersect inlet passage 22; the first of these bores receiving a reciprocable unloading valve plunger 28 and the second receiving a reciprocable pilot valve plunger 29. The bore 26 is encircled by three longitudinally spaced annular chambers 31, 32 and 33 and is provided at its left end with a counterbore having an end face 34. This face 34 serves as a valve seat for the left end of valve plunger 28. Annular chamber 32 is connected with supply passage 22 by passage 35, and annular chambers 31 and 33 are connected with exhaust and delivery passages 24 and 23, respectively. The unloading plunger 28 is formed with an annular groove 36 which defines two spaced valve lands 37 and 38. The left end face of land 37 is subject to the pressure in supply passage 22 and constitutes the piston or movable member of an expansible chamber fluid pressure biasing motor which urges the unloading plunger 28 toward its unloading position. The right end face of land 38, on the other hand, is the piston or movable member of a piloted pressure motor whose working chamber is the right end of bore 26 and which urges the plunger 28 in the opposite direction. A light coil spring 39 also urges the plunger 28 toward its loading position.

Encircling pilot valve bore 27 are two spaced annular chambers 41 and 42; the chamber 41 communicating with the right end of valve bore 26 via pilot pressure passage 43, and the annular chamber 42 communicating with exhaust passage 25 and relief passage 44. A flow restrictor 45 is located in pilot pressure passage 43 and between this restriction and the right end of valve bore 26 is a relief valve 46 which controls communication between passage 43 and relief passage 44. The pilot valve plunger 29 is formed with an annular groove 47 which defines two spaced valve lands 48 and 49. Supply passage 22 is in continuous communication with delivery passage 23 via a control passage comprising restricted axial passage 51 extending through pilot valve plunger 29 and the passage 52. Valve plunger 29 is biased into contact with snap ring 53 by a light coil spring 54. The opposite ends of plunger 29 are subject to the pressures in the control passage upstream and downstream, respectively, of the restricted passage 51 and serve as the pistons of a double-acting fluid pressure motor which urges this plunger to the right against the bias of spring 54.

The closed-center distributing valve 13 comprises a housing having two through bores 55 and 56 which receive the two valve plungers 17 and 18. Since these plungers and the housing chambers associated with them are identical, only the plunger 17 and its housing chambers will be described in detail. The bore 55 is encircled by six longitudinally spaced annular chambers 57 through 59 and 61 through 63. Annular chambers 59 and 61 are connected with inlet port 64 by passages 65 and 66, respectively. Annular chambers 57 and 63 are interconnected by a passageway 67 which, in turn, communicates with exhaust port 68. Branched passageway 69 extends between passage 67 and inlet port 64, and located in this passageway is a check valve 71. The valve 71 is biased open by spring 72 as shown in the drawing.

Valve plunger 17 is formed with two annular grooves 73 and 74 which define three longitudinally spaced valve lands 75, 76 and 77. Axial bores 78 and 79 extend inward from opposite ends of the plunger 17 and intersecting each bore are two sets of radial passages 81 and 82, and 83 and 84, respectively. Spring-biased check valves 85 and 86 are mounted in the bores 78 and 79, respectively.

In operation, the components are interconnected as shown in Fig. 1 and in addition the annular chambers 58 and 62 of distributing valve 13 are connected with opposite sides of a double-acting piston motor (not shown). When distributing valve plunger 17 is in its neutral position, valve lands 75, 76 and 77 interrupt flow from annular chambers 59 and 61 to either of the motor chambers 58 and 62 or to the exhaust port 68. When flow through unloading device 19 ceases, the pressures acting on opposite ends of pilot plunger 29 will be equal and spring 54 will shift this plunger into contact with ring 53. In this position of the pilot plunger 29, the right end of valve bore 26 is connected with sump 12 via pilot pressure passage 43, annular chamber 41, plunger groove 47, annular chamber 42, exhaust passage 25, and return line 16. The pressure in supply passage 22 now shifts the unloading plunger 28 toward its unloading position against the bias of spring 39. The pump 11 is then unloaded to sump 12 via supply line 14, supply passage 22, valve bore 26, annular chamber 31, exhaust passage 24, and return line 21.

When the distributing valve plunger 17 is shifted to the right, radial passages 81 and 82 will register with annular chambers 58 and 59, respectively, establishing a flow path between distributing valve inlet port 64 and one side of the double-acting piston motor through passage 65, annular chamber 59, radial passages 82, axial bore 78, check valve 85, radial passages 81, and annular chamber 58. Pressure fluid in supply passage 22 will then flow through restricted passage 51, passage 52, delivery passage 23, and delivery line 15 to the inlet port 64 of the distributing valve and from there to motor chamber 58. Fluid flowing along this path experiences a drop in pressure as it passes through restricted passage 51. The pressures upstream and downstream of this passage act on opposite ends of the pilot plunger 29. When the pressure differential across this plunger is sufficient to overcome the bias of spring 54, the plunger will shift to the right thereby connecting supply passage 22 with pilot pressure passage 43 through valve bore 27 and annular chamber 41. The pressures acting on opposite ends of unloading plunger 28 will now be equal and since the cross-sectional areas of these ends are equal, spring 39 will shift the plunger 28 to the left into contact with valve seat 34. This movement closes the unloading path and connects supply passage 22 with delivery passage 23 through passage 35, annular chamber 32, plunger groove 36, and annular chamber 33. The pump 11 is now loaded and its entire output is delivered to motor chamber 58 of the distributing valve 13. Fluid returning from the opposite side of the double-acting motor is transmitted to the sump 12 via motor chamber 62, radial passages 84, axial bore 79, check valve 86, radial passages 83, annular chamber 63, passage 67, exhaust port 68, and return line 16.

When distributing valve plunger 17 is returned to its neutral position, flow from delivery line 15 will be interrupted and the pressures acting on opposite ends of pilot plunger 29 will again be equal. Spring 54, therefore, shifts this plunger to the left into contact with snap ring 53 thereby disconnecting pilot pressure passage 43 from supply passage 22 and connecting it with the sump 12 via chamber 41, groove 47, annular chamber 42, exhaust passage 25, and return line 16. Since the right end of bore 26 is now vented, the pressure acting on the left end of unloading plunger 28 shifts this plunger to its unloading position against the bias of spring 39.

As stated previously, unloading plunger biasing spring 39 is a light spring. As a result, the unloaded pressure of the pump 11 is low and energy losses are minimized. However, if the double-acting motor is loaded, and thus motor chamber 58 is pressurized when radial passages 82 are brought into registry with annular chamber 59, the unloaded pressure of pump 11 will not be sufficient to unseat check valve 85. If check valve 85 does not open, there will be no flow from delivery line 15 and consequently, pilot plunger 29 will not shift to its piloted-pressure motor pressurizing position. To remedy this situation, plunger 17 is so constructed that the distance between the left edge of valve land 76 and the left edge of passageway 69 is less than the distance between the right edge of radial passages 82 and the left edge of annular chamber 59. This arrangement affords a momentary flow path between inlet port 64 and exhaust port 68 through passage 65, annular chamber 59, plunger groove 73, and passageway 69 before radial passages 82 register with annular chamber 59. The restriction afforded by the momentary flow path is less than the restriction afforded by the unloading path and therefore the flow rate through restricted passage 51 will be sufficient to cause pilot plunger 29 to shift. When valve land 75 overtravels seat land 87, the momentary flow path will be interrupted so that the full pressure of the pump 11 will be available to operate the double-acting motor.

Movement of the valve plunger 17 to the left causes the unloading device to operate in the same manner as that just described. However, in this case, motor chamber 62 is pressurized and motor chamber 58 is vented and the momentary flow path includes plunger groove 74 rather than plunger groove 73.

It should be observed that when distributing valve plunger 17 is shifted rapidly in either direction, the momentary flow path will not be open long enough to cause pilot plunger 29 to shift. However, when either plunger groove 73 or 74 is within seat land 87, inlet port 64 will communicate with exhaust port 68 through check valve 71, branched passage 69, and passageway 67. Thus fluid will flow through the check valve to the sump 12 until the pressure drop across this valve is sufficient to close it against the bias of spring 72. This alternate momentary flow path through check valve 71 insures that the flow rate through restricted passage 51 will be sufficient to shift the pilot plunger 29 even though distributing plunger 17 is moved too rapidly for the other momentary flow path to be effective.

If, when the plunger 17 is away from its neutral position and the unloading plunger 28 is in its loading position, system pressure rises above a safe limit, relief valve 46 will open permitting communication between supply passage 22 and exhaust passage 25 via valve bore 27, annular chamber 41, pilot pressure passage 43, flow restrictor 45, relief valve 46, relief passage 44, and annular chamber 42. Because of the presence of the flow restrictor 45, the pressure in the right end of bore 26 will be less than the pressure in the left end of this same bore after relief valve 46 opens. This pressure differential across unloading plunger 28 causes the plunger to move toward its unloading position, thus providing additional pressure relief by allowing fluid to flow from supply passage 22 to sump 12 through valve bore 26, annular chamber 31, and exhaust passage 24. This arrangement, in effect, converts the nongraduating unloading valve into a graduating relief valve because the position of plunger 28 will be governed by system pressure once relief valve 46 has opened. After the surge has subsided, the relief valve 46 will close and the pressures acting on opposite ends of the unloading plunger 28 will again be equalized. This plunger will then move back to its loading position.

As stated previously, the drawing and description relate only to a preferred embodiment of the invention. Since many changes can be made in the structure of this embodiment without departing from the inventive concept, the following claims should provide the sole measure of the scope of the invention.

What is claimed is:

1. In combination, a supply passage, a delivery passage, and an exhaust passage; an unloading valve shiftable between loading and unloading positions in which it connects the supply passage with the delivery passage and with the exhaust passage respectively; means biasing the unloading valve toward one of said positions; a piloted pressure motor for shifting the unloading valve toward the other position against the biasing means; a control passage connecting the supply passage with the delivery passage; and piloting means responsive to the rate of flow through the control passage for pressurizing or venting the piloted motor, whereby when the flow rate through the control passage is above a predetermined minimum rate, the unloading valve is shifted toward its loading position and when the flow rate is below said minimum rate, the unloading valve is shifted toward its unloading position.

2. In combination, a supply passage, first and second exhaust passages, a delivery passage, and a pilot pressure passage; an unloading valve shiftable between loading and unloading positions in which it connects the supply passage with the delivery passage and with the first exhaust passage, respectively; resilient means biasing the unloading valve toward the loading position; two opposed movable abutments of equal areas acting on the unloading valve, one of the abutments being subject to the pressure in the supply passage and serving to move the unloading valve toward its unloading position against the bias of the resilient means, and the other abutment being subject to the pressure in the pilot pressure passage; a pilot valve shiftable between first and second positions in which it connects the pilot pressure passage with the supply passage and with the second exhaust passage, respectively; resilient means biasing the pilot valve toward its second position; a control passage connecting the supply passage with the delivery passage; and control means responsive to the rate of flow through the control passage for shifting the pilot valve toward its first position against the bias of the resilient means, whereby when the rate of flow is above a predetermined minimum rate the pilot pressure passage is connected with the supply passage and the unloading valve is shifted toward its loading position, and when the rate of flow is below said minimum rate the pilot pressure passage is connected with the second exhaust passage and the unloading valve is shifted toward its unloading position.

3. The combination defined in claim 2 including a flow restrictor located in the pilot pressure passage; and a relief valve located in the pilot pressure passage between the flow restrictor and said other abutment and communicating with one of the exhaust passages.

4. The combination defined in claim 2 in which the pilot valve is a plunger valve; and in which the control means comprise a restricted axial passage extending through the plunger of the pilot valve and forming a portion of the length of said control passage, and the opposite ends of the pilot plunger on which the pressures upstream and downstream of said restricted passage act.

5. In combination, a supply passage, two exhaust passages, a delivery passage, and two motor passages; a distributing valve having a neutral position in which it interrupts flow from the delivery passage, the valve being shiftable in one direction from the neutral position to connect one motor passage with the delivery passage and to connect the other motor passage with the exhaust passage, and shiftable in the opposite direction to reverse these motor passage connections; means rendered effective upon shifting the distributing valve away from its neutral position for providing a momentary flow connection between the delivery passage and one of the exhaust passages; an unloading valve located in the delivery passage upstream of the distributing valve and shiftable between loading and unloading positions in which the supply passage is connected with the delivery passage and with the other exhaust passage, respectively; means biasing the unloading valve toward its unloading position; a control passage extending between the supply passage and the delivery passage at a point downstream of the unloading valve; and means operative upon commencement of flow through said momentary flow connection for shifting the unloading valve toward its loading position.

6. The combination defined in claim 5 in which the means for shifting the unloading valve comprises an expansible chamber fluid pressure motor having a movable member connected with the unloading valve; a flow restriction located in the control passage; a third exhaust passage; a pilot valve shiftable between first and second positions in which it connects the expansible chamber motor with the supply passage and with the third exhaust passage, respectively; means biasing the pilot valve toward its second position; and a double-acting fluid-pressure motor subject in opposite directions to the pressures upstream and downstream of said flow restriction for shifting the pilot valve toward its first position against the biasing means.

7. The combination defined in claim 6 in which the means biasing the unloading valve toward its unloading position comprises a second expansible chamber fluid pressure motor, this motor being connected with the supply passage, and in which the effective areas of the two expansible chamber motors are equal; and including a spring acting on the unloading valve in opposition to the second motor.

8. The combination defined in claim 5 in which the means for shifting the unloading valve comprises a pilot-pressure passage; a fluid pressure motor having a movable member connected with the unloading valve and having a working chamber communicating with the pilot-pressure passage; a first flow restriction located in the control passage; a second flow restriction located in the pilot-pressure passage; a third exhaust passage; a relief valve located in the pilot-pressure passage between the second flow restriction and the working chamber and communicating with one of the exhaust passages; a pilot valve shiftable between first and second positions in which it connects the pilot-pressure passage with the supply passage and with the third exhaust passage, respectively; means biasing the pilot valve toward its second position; and a double-acting fluid-pressure motor subject in opposite directions to the pressures upstream and downstream of the first flow restriction for shifting the pilot valve toward its first position against the biasing means.

References Cited in the file of this patent

UNITED STATES PATENTS

| | | |
|---|---|---|
| 2,219,488 | Parker | Oct. 29, 1940 |
| 2,665,552 | Deardorff | Jan. 12, 1954 |
| 2,765,808 | Tyeeman | Oct. 9, 1956 |
| 2,813,536 | Gordon | Nov. 19, 1957 |
| 2,835,266 | Morte | May 20, 1958 |
| 2,837,107 | Rockwell | June 3, 1958 |
| 2,852,918 | Schwary | Sept. 23, 1958 |